United States Patent
Stasior et al.

(10) Patent No.: US 9,594,540 B1
(45) Date of Patent: Mar. 14, 2017

(54) TECHNIQUES FOR PROVIDING ITEM INFORMATION BY EXPANDING ITEM FACETS

(75) Inventors: William F. Stasior, Los Altos, CA (US); Matthew W. Amacker, Santa Clara, CA (US); Joel D. Tesler, Cupertino, CA (US)

(73) Assignee: A9.com, Inc., Palo Alto, CA (US)

( * ) Notice: Subject to any disclaimer, the term of this patent is extended or adjusted under 35 U.S.C. 154(b) by 798 days.

(21) Appl. No.: 13/345,454

(22) Filed: Jan. 6, 2012

(51) Int. Cl.
*G06F 7/00* (2006.01)
*G06F 17/30* (2006.01)

(52) U.S. Cl.
CPC ............... *G06F 7/00* (2013.01); *G06F 17/30* (2013.01)

(58) Field of Classification Search
CPC ............. H01S 5/02248; H01S 5/02415; H01S 5/0265; H01S 5/06256; G06F 17/3053; G06F 17/30253; G06F 17/30265; G06F 17/3064; G06F 17/30864
See application file for complete search history.

(56) References Cited

U.S. PATENT DOCUMENTS

| | | | |
|---|---|---|---|
| 8,301,615 B1* | 10/2012 | Riley et al. | 707/707 |
| 2005/0108216 A1* | 5/2005 | Schramm-Apple et al. | 707/3 |
| 2006/0294071 A1* | 12/2006 | Weare et al. | 707/3 |
| 2007/0204232 A1* | 8/2007 | Ray et al. | 715/738 |
| 2007/0208738 A1* | 9/2007 | Morgan | 707/6 |
| 2008/0040221 A1* | 2/2008 | Wiseman et al. | 705/14 |
| 2009/0222412 A1* | 9/2009 | Lee et al. | 707/3 |
| 2009/0287559 A1* | 11/2009 | Chen et al. | 705/14.23 |
| 2009/0292674 A1* | 11/2009 | Dasdan et al. | 707/3 |
| 2011/0060752 A1* | 3/2011 | Lane et al. | 707/766 |
| 2011/0125764 A1* | 5/2011 | Carmel et al. | 707/749 |
| 2011/0252013 A1* | 10/2011 | Lempel et al. | 707/706 |
| 2011/0270843 A1* | 11/2011 | Albin | 707/741 |
| 2012/0011129 A1* | 1/2012 | van Zwol et al. | 707/748 |
| 2012/0023095 A1* | 1/2012 | Wadycki et al. | 707/723 |
| 2012/0173521 A1* | 7/2012 | Lam | 707/734 |
| 2013/0024440 A1* | 1/2013 | Dimassimo et al. | 707/709 |
| 2013/0152015 A1* | 6/2013 | Costenaro et al. | 715/808 |
| 2013/0226916 A1* | 8/2013 | Dredze et al. | 707/727 |

OTHER PUBLICATIONS

"Epinions.com—Compare Products Before You Buy," retrieved on Sep. 9, 2011, from http://www.epinions.com/compare.html?submitted_form=side_by_side&pro d107626938=o . . . , 3 pages.

* cited by examiner

*Primary Examiner* — Tuan A Pham
(74) *Attorney, Agent, or Firm* — Seed IP Law Group LLP (57) ABSTRACT

Displaying item attributes may include receiving, from a client device, a search query, providing, for display to a user, a network page containing search result items relevant to the received query and selectable facets, where each selectable facet corresponds to an attribute associated with at least one of the search result items, and, in response to a selection of one of the selectable facets, identifying each of the search result items that is associated with the attribute corresponding to the selected facet, and causing the attributes corresponding the selected facet to be exposed for each of the identified search result items. The identified search results are retained with exposed attributes.

24 Claims, 6 Drawing Sheets

TECHNIQUES FOR PROVIDING ITEM INFORMATION BY EXPANDING ITEM FACETS

BACKGROUND

Entities having a presence in an electronic environment, such as may be provided via a Web site or other such source of content, often take advantage of the full capabilities of modern Web-based services to deliver a compelling user experience. For example, a user may access network resources such as Web sites offering items, products, or services for sale. These Web sites often contain many different types of content, often on the same page and in near proximity to each other. Search results presented by a Web site (e.g., in response to a query) often include a limited amount of information about each item, such as price, title, an image, and availability, in order to minimize the amount of space occupied by each search result item on the page. However, the web site likely has additional information about an item that may be of interest to the user.

Search result items are often presented to a user along with user-selectable controls ("facets") associated with different attributes of the items (e.g., brand, size, age range, etc.). Selecting a facet causes filtering of the search results to items only associated with the selected attribute. The filtered search results may have the unintended consequence of omitting an item that may be of interest to the user even though the item may not have the selected attribute.

DETAILED DESCRIPTION

Techniques are presented for providing personalized content, which in at least some embodiments may be created for and/or displayed to a user in real time based on the user's activity with respect to certain content. In response to a search request for a content item on a network resource including a collection of content, a plurality of items and associated item (product) information (e.g., item attributes such as price, availability, and the like) may be returned and displayed to the user. In some embodiments, the information displayed to a user may also include an interface with displayed user-selectable controls (e.g., widgets, buttons, hyperlinks, or other indicators) that each correspond to one or more of the item attributes and enable user control of the display of item-specific information about those item attributes. The user-selectable controls corresponding to item attributes will be hereinafter identified as "facets." Each facet may correspond to one or more item attributes associated with one or more of the items provided to the user. In response to a selection of a facet, the attribute associated with the selected facet is displayed for each item.

For example, in response to receiving a search query from a client, a network page rendered by the browser executing on the client device displays search results (e.g., items with a title, price, etc.) and a menu of selectable facets. Suppose for example, a query for "computer memory" is received. Search results (items) related to the query are displayed (e.g., memory modules and kits) and multiple facets are displayed along with the items (e.g., "memory type," "brand," and the like). The attributes associated with displayed facets are not initially displayed with the search result items. By selecting one of the displayed facets (e.g., "memory type"), the type of memory for each of the displayed items (e.g., DDR, DDR2, DDR3) is displayed with the item, in one embodiment, by animating the movement of the types of memory from the "memory type" facet to a position correlating with the item.

An electronic marketplace environment often generates a new network page when a facet is selected, and the new network page often includes only search result items that include the attribute associated with the selected facet. In at least some instances, only a subset of the search result items may include the attribute associated with the selected facet. By "fanning out" the attributes associated with the selected facet, the environment does not have to generate a new network page.

A network resource provider may record user activity associated with selecting facets. This facet selection history may be analyzed and used to rank the individual facets themselves, expose "popular" or most frequently selected facets, automatically display the attribute associated with a "popular" facet in the network page with each search result item, remove infrequently selected facets from a default set of facets that are often displayed in connection with a particular category of items, and the like.

Targeted product advertising may be created based on the user behavior data. For example, facets and attributes for an item (product) determined to be a particular focus in users' searches may be included in product advertisements.

Figure 1:
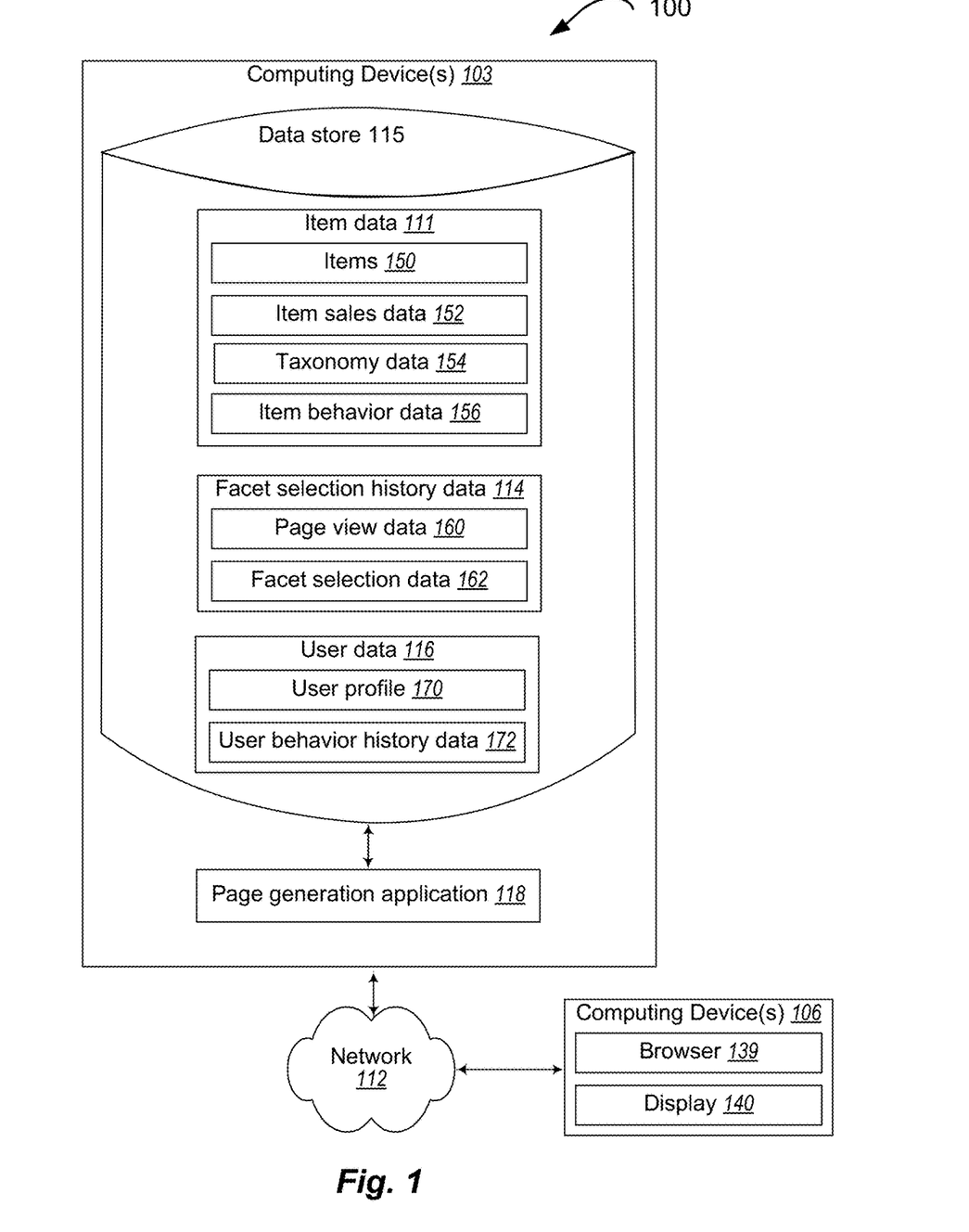
FIG. 1 illustrates an environment in which various embodiments may be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 includes an electronic computing device(s) (e.g., servers) 103, which can include any appropriate device operable to send and receive requests, messages, or information over an appropriate network 112 and convey information back to a user of a client device 106. Examples of such client devices include personal computers, cell phones, handheld messaging devices, laptop computers, set-top boxes, personal data assistants, electronic book readers, and the like. The device 106 may include a processor and memory having instructions stored thereon that are executable on the processor. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, and the environment includes one or more Web server computing devices 103 for receiving requests and serving content in response thereto, although for other networks, an alternative device serving a similar purpose could be used, as would be apparent to one of ordinary skill in the art.

The computing device(s) 103 may include at least one application server having a page generation application 118 and a data store 115. It should be understood that there can be several application servers, layers, or other elements, processes, or components, which may be chained or otherwise configured, which can interact to perform tasks such as obtaining data from an appropriate data store. As used herein, the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to a viewer, which may be served to the viewer by the Web server in the form of HTML, XML, or another appropriate structured language in this example.

The handling of all requests and responses, as well as the delivery of content between the client device 106 and the computing device 103, can be handled by the Web server. It should be understood that the Web and application servers are not required and are merely example components, as structured code discussed herein can be executed on any appropriate device or host machine as described elsewhere herein. Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The data store 115 can include several separate data tables, databases, or other data storage mechanisms and media for storing data relating to a particular aspect. For example, the data store illustrated includes mechanisms for item data 111, and user information 116. The data store also is shown to include a mechanism for storing facet selection history data 114, which can be used for reporting, generating statistics, and other such purposes. The item data 111 may include item (e.g., product, service, bundle of products and/or services, etc.) information 150 (e.g., item-associated information such as price, availability, attributes associated with each item, and the like.) Item information 150 may further include information related to facets associated with each item. For example, a search for an item (as described below in greater detail) may retrieve from 150 and return item information including facets and attributes associated with the searched item. The item data 111 may further include item sales data 152 associated with the statistics of item sales over a period of time. The item data 111 may also include taxonomy data 154 associated with the stored items in relation to item information classification and presenting item information in a hierarchical structure. The item data 111 may further include item behavior data 156 associated with item's performance (for example, item ranking among other similar items in relation to item advertisements, information about item popularity based on a number of viewings of the item, and the like).

The facet selection history data 114 may include page view data 160 associated with page views of items and item information as presented to the user in response to item search requests, and facet selection data 162 storing information regarding selection of facets associated with displayed items and item information. The user data 116 may include user profile 170 including data associated with the user (e.g., user login information, user billing and shipping address, information regarding purchased items, and the like). The user information may further include user behavior history data 172, e.g., user behavior-associated data accumulated over a period of time which may track user search and purchasing behavior patterns. It should be understood that there can be many other types of information or data stored in the data store, such as for page image information and access right information, which can be stored in any of the above-listed mechanisms as appropriate or in additional mechanisms in the data store 115.

The data store 115 is operable, through logic associated therewith, to receive instructions from the application server 103 and obtain, update, or otherwise process data in response thereto. In one example, a viewer might submit a search request for a certain type of item via a browser 139 displayed to the user on the display 140 of the client device 106. In this case, the data store might access the user information to verify the identity of the viewer, and can access the catalog detail information to obtain information about items of that type. The information then can be returned to the viewer, such as in a results listing on a Web page that the viewer is able to view via a browser on the user device 106. Information for a particular item of interest can be viewed in a dedicated page or window of the browser. As used herein, an item includes any product or item which may be consumed by a consumer. Examples include tangible items, such as consumer products. Examples also include electronic items which may be downloaded and/or streamed, including audio files, video files, and other digital content. Examples of items for consumption also include services which may be performed for and/or on behalf of consumers. Items for consumption may be offered by merchants operating an electronic marketplace on one or more computing devices 103 such that the users may search, via devices 106 utilizing search services (e.g., Web search engines), for items for consumption offered by the merchant. The search service may comprise a number of various implementations, including, but not limited to, a software application component executed on a computing device, such as one or more Web servers. In one embodiment, the service may be offered as a part of remote computing services that together make up a cloud computing platform, offered over the Internet. The service may be configured to run in a Web server environment, such as a pure Java HTTP Web server environment.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limited to the scope of the disclosure.

Figure 2:
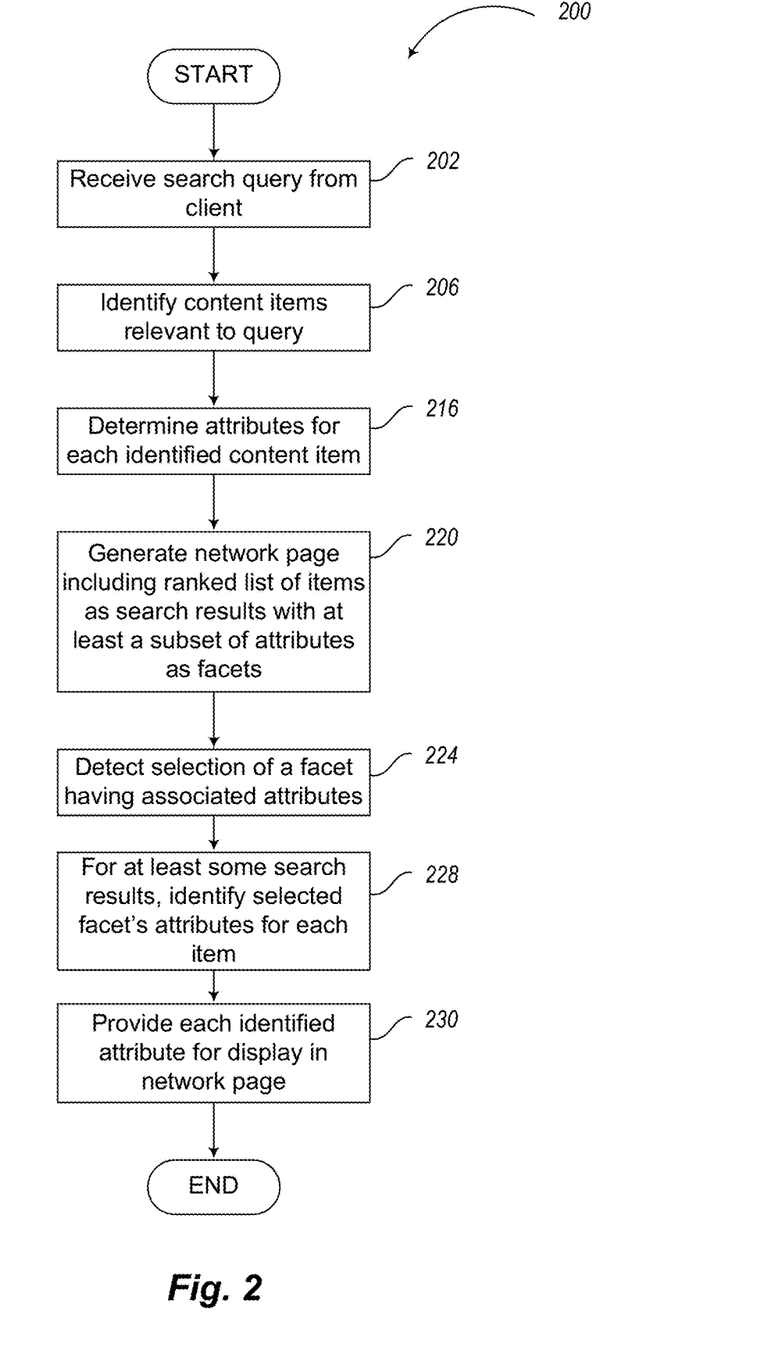
FIG. 2 is a process flow diagram for expanding facets associated with content provided to a user in accordance with an embodiment.

FIG. 2 is a process flow diagram for expanding facets associated with items. The process 200 begins at block 202, where a search request for items is received. In some embodiments a browse request may be received from a client device based on a user selection of a selectable element (e.g., a button, a hyperlink, and the like) rendered on a browser and associated with content to be returned in response to the selection. In another example, a user may submit a request to an electronic marketplace for a particular item or items, using one or more search terms, such as "watches." The search terms may be typed in or otherwise inserted in a search window rendered by the network resource and associated with a search engine.

The items relevant to the search request may be identified, and provided in response to the search request. Accordingly, at block 206, in response to the search request, items corresponding to the search request are identified. The items may be identified based, for example, on one or more search terms included in the search request. At block 216, attributes for each identified item may be determined. There may be different techniques to determine attributes for each item. Each item may be associated with one or more attribute fields, some of which may be displayed. The determined associations may be cached, for example, in a temporary data store associated with the content provider.

Figure 4:
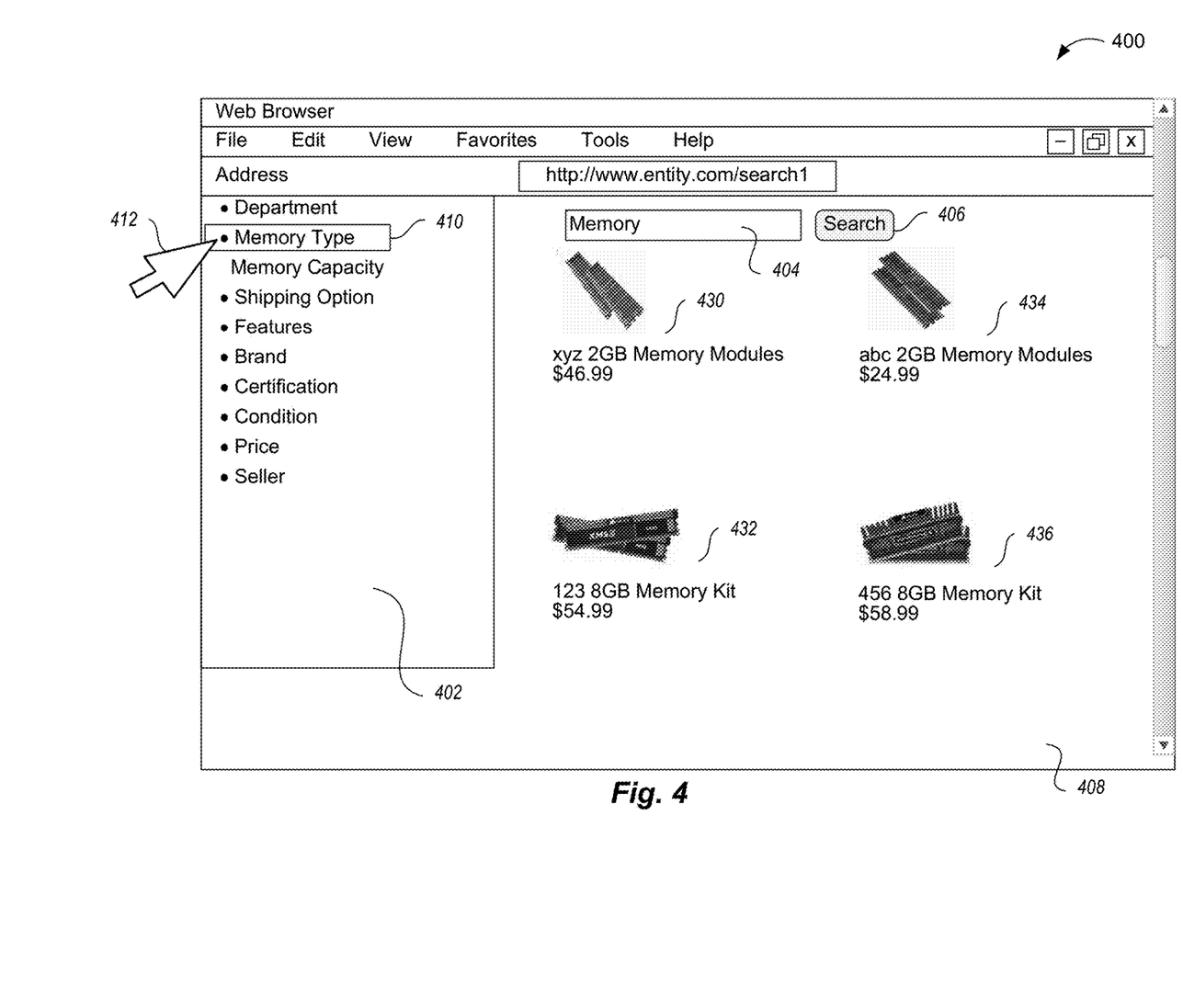
FIGS. 4-6 are example screenshots illustrating expanding facets associated with content provided to a user in accordance with an embodiment.
Figure 5:
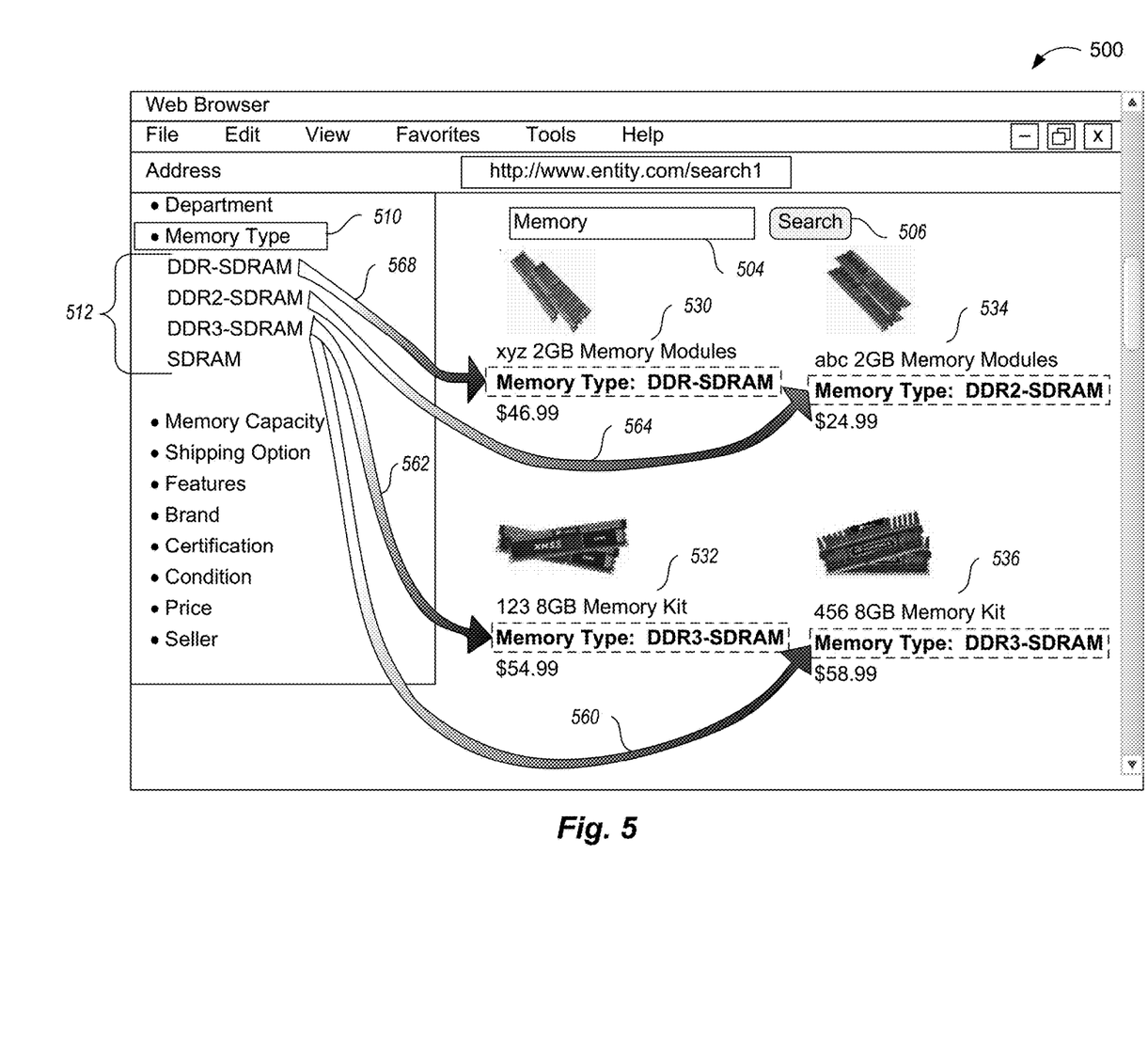
Figure 6:
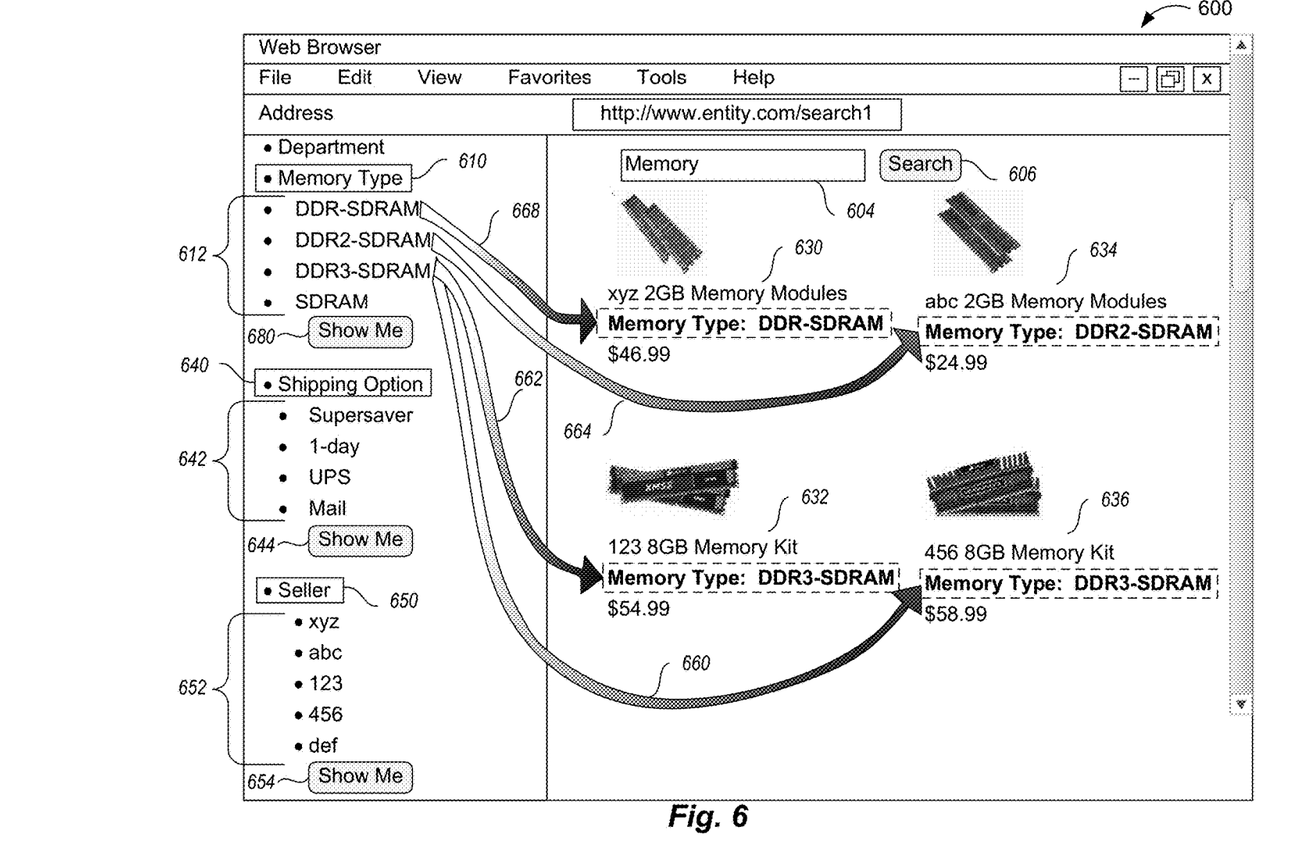

At block 220, a network page of search results (e.g., items) may be generated and provided to the client device 106. The search results page may contain items considered relevant to the query (block 202), where a subset of item features is displayed along with each item and facets are provided for selection by the user to identify additional attributes for one or more items. The search results may be displayed in a ranked order. In an embodiment, the identified search results items may be displayed with some associated information (e.g., a subset of information associated with the item such as item images, price, availability, and the like). In addition, facets associated with search results may be displayed, as a separate grouping, such as on a side of the page. A facet represents an attribute field (e.g., brand, gender, display type, etc.) that is not initially displayed in the search results with each item. Selecting one of these facets causes the attribute from the attribute field to be displayed with the search results, as described below in greater detail. Accordingly, at least some item attributes, while not being displayed to the user, may be associated with a widget representing the facet on the screen (e.g., a hyperlink, a button, or other selectable element). For example, a facet displayed along with watches as the search results may include "Wristband Material" and the corresponding values associated with "Wristband Material" attribute may be, for example "ceramic," "fabric," "leather," and "metal." Examples of items displayed in accordance with various embodiments are illustrated in FIGS. 4-6 and described below.

At block 224, a selection of a facet may be detected. For example, a user may select (e.g., click on) a facet displayed on the page. At block 228, the value associated with the selected facet, for each item currently displayed on the search results page, is identified. For example, suppose the search results page displays various watches (in response to a query for "watches"), and displays, for each watch, an image of the watch, a price and a title. And suppose that multiple facets are displayed as well, and one of the facets displays "Wristband Material". In response to selection of the "Wristband Material" facet (block 224), the wristband material value for each watch display in the search results page (or at least a subset of them) is identified. In another example, the wristband material values for each watch provided in the search results page are identified in block 216 and stored in a cache memory. Thus, in block 228, the wristband material values may be retrieved from the cache memory.

At block 230, the attribute values identified in block 228 may be displayed or exposed along with the corresponding item. Using the watch example mentioned above, the identified attribute values (e.g., wristband material) will be displayed or appear along with initially displayed item information.

A selection of a different facet will cause the steps 224-230 of the process 200 to repeat, such that information about item attributes for multiple selected facets may, in some embodiments, be simultaneously displayed, while in other embodiments a new selected facet will replace a previously selected facet such that the current updated displayed information includes indications only of the one or more item attributes for the new selected facet. A selection of the same facet may cause the facet attributes to be removed from the display on the page of search results. Accordingly, when a request associated with the same facet is received, the attributes associated with each item displayed to the user may be removed and the facet may be returned to its original state. The item information may be stored in a standard data structure with particular fields allocated for each item attribute. In some instances, selecting a facet may cause the facet to "expand" and display the associated attribute values. Conversely, when the facet is selected a second time, the facet "collapses" and the associated attribute values are no longer displayed.

Some information (e.g., some item attributes associated with particular facets), however, may be missing from the item information. In an embodiment, item information associated with each item may be controlled for integrity; for example, missing item attributes for particular items may be identified. Specifically, when item attributes are identified and displayed with each item in response to a selection of a particular facet, missing item attribute data fields associated with items, if any, may be detected. For example, the missing attribute fields may be detected and a message notification may be provided that may indicate missing attribute fields.

Figure 3:
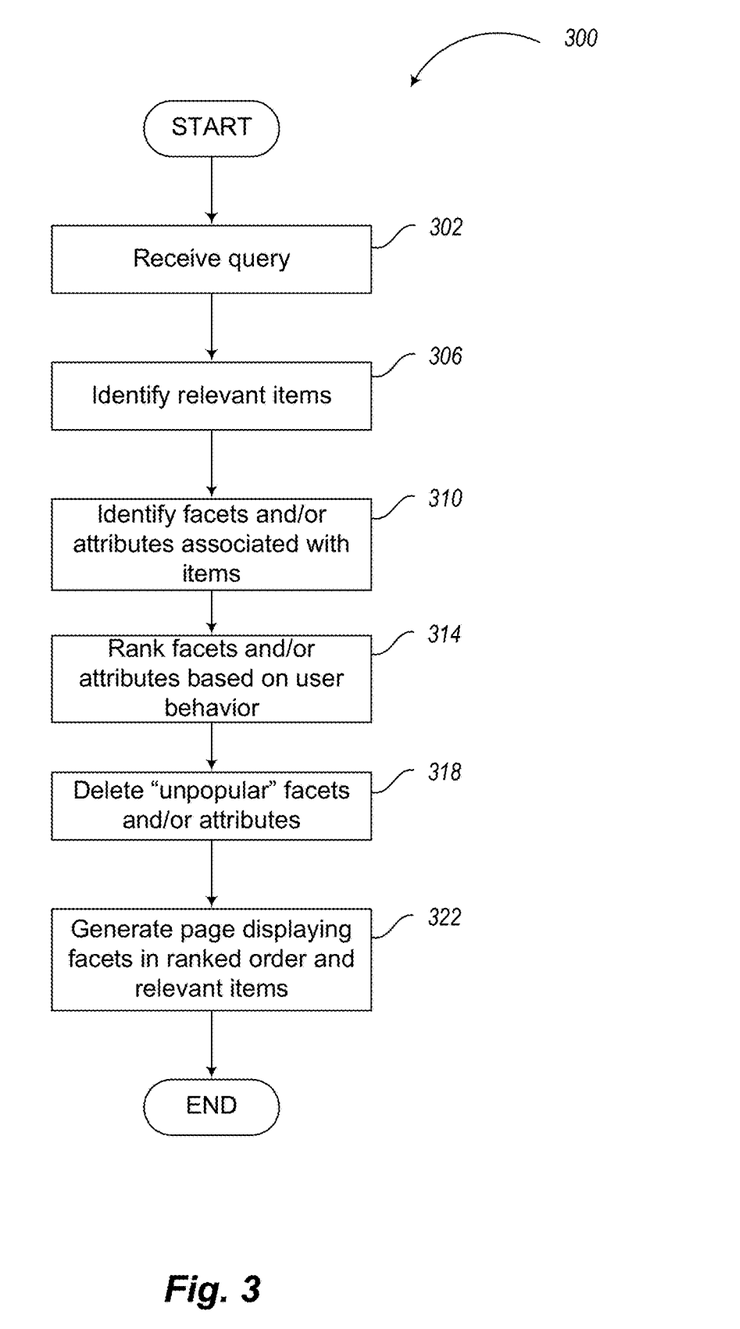
FIG. 3 is a process flow diagram for grouping facets based on user behavior data in accordance with an embodiment.

In an embodiment, a user conducting a search for an item using facet selections as described in reference to FIG. 3 may save his search associated with the item for future reference. For example, suppose a user tends to search, every once in a while (e.g., once in six months), for a particular type of item (e.g., shoes of a particular size and particular brand). The user may save the results page showing all facets and/or attributes that are of interest to the user along with the searched items (e.g., a particular brand and size—associated facets and/or attributes associated with a search for shoes) so that next time the user conducts the same search, the facets and/or attributes of interest will be provided to the user in response to her search request. For example, the user may name (e.g., tag) particular facets, attributes associated with a search for a particular item and, when conducting a next search, may identify in her search request the named (tagged) information (e.g., facets) so that the named information appears with the search results.

In an embodiment, user behavior associated with the facets may be recorded. For example, the most popular facets and/or attributes for particular items may be determined based on facet and/or item attribute selections made by users while searching for items. The user behavior associated with facets and/or attributes may be further associated with the items that are sold or viewed. For example, a sequence of user selections ("clicks") may be determined that led a user from selecting particular facets in relation to a particular item to viewing or purchasing the item. The resulting data feed based on the user behavior in relation to searched, viewed and purchased items may be provided for further analysis by the electronic marketplace entity such as a content provider.

User behavior data associated with item searches and corresponding facet selection may be used to provide the facets in a certain rank order, whether the ranking is based on aggregated user behavior or tailored specifically for a particular user. For example, recording user behavior of selecting particular facets allows a system to determine which facets and attributes are of particular interest to a user (or users), which facets and attributes may not be of interest, and the like. Based on this user behavior, the users' searches for items may be streamlined by providing "important" facets and/or attributes along with the items returned with search results and/or removing the least important facets and/or attributes from item information. In other words, item features (e.g., facets and/or attributes) that were determined to be important to users may be accentuated while less important features (facets and/or attributes) may be displayed less prominently or even removed. For example, item attributes determined to be "important" to users (e.g., selected more often than others) may be included in item information provided on the results page, without having to select a facet to show the "important" attributes. In another example, facets that the users have not selected in relation to a search for an item more than a determined number of times, may not be shown with the item.

FIG. 3 illustrates a process flow diagram for grouping item facets based on user behavior data in accordance with an embodiment. The process 300 begins at block 302, where a search query for an item is received from a client device. At block 306, items relevant to the search query may be identified similar to the process described in reference to FIG. 2. At block 310, attributes and facets associated with identified items may be determined as described above in reference to FIG. 2. At block 314, the most popular facets and/or item attributes may be determined for each identified item. The most popular facets and/or attributes may be identified based on the aggregated user behavior, or based on behavior associated with a particular user. Facets may be ranked for popularity of each facet for the item and grouped based on the determined ranking. For example, the most popular facets may be grouped based on the frequency of their access by users searching for items associated with these facets. Ranking of facets and/or item attributes may be based on frequency of selection by users in relation to the searched item.

At block 318, the least popular facets and/or attributes may be removed from item information. For example, the least popular facets may be deleted from a list of facets associated with the type of item. Further, new facets may be added based on information derived from the user behavior, for example, based on search terms used by the user while refining her search.

At block 322, a results page may be generated displaying the determined facet groupings in association with relevant items. For example, a link to item information containing the most important item (facet) attributes with the displayed item may be rendered on a page of search results returned to a user in response to a search request. In another example, a facet grouping may be displayed on the page of search results in a ranked order. In yet another example, the highest ranked facets may be displayed with item information for the searched items. The process 300 then ends.

Based on the determined "popular" item attributes and facets targeted, advertisements may be created for an item. For example, advertisements may use the determined popular attribute or popular facet, in addition to (or in place of) using search terms associated with the item. Based on user behavior data, search terms may be determined that "lead" the users to selection of particular facets and facet attributes when conducting their searches. Accordingly, particular search terms may be associated with particular facets. For example, a facet "wristband material" may be determined to be associated with the search term "wrist watch." The facet may be further determined to be "popular" (e.g., rank higher than other facets associated with the item). Accordingly, the determined "search term-facet" associations may be stored and used in subsequent searches for an item. For example, entering a particular search term may cause a facet or facets corresponding to the search term to be retrieved and displayed (e.g., with search results returned in response to the original search request for an item).

FIGS. 4-6 illustrate exemplary screenshots in accordance with embodiments described herein. The screenshots illustrated in FIGS. 4-6 are shown for illustrative purposes only and should not be interpreted as limiting the scope of the various embodiments. FIG. 4 illustrates a network page 400 rendered by a Web browser that provides a search box 404 and a search radio button 406. The FIG. 4 example illustrates that a user typed in the search query "memory" and has received a network page of search results 408 and associated item information (item images and product data) that are displayed to the user. The search results include 2 GB memory modules sold by company xyz, and associated information 430; 8 GB memory kit sold by company 123, and associated information 432; 2 GB memory modules sold by company abc, and associated information 434; and 8 GB memory kit sold by company 456, and associated information 436. The network page further displays facets 402. As described above, each facet 402 is associated with an attribute for at least a subset of the search results displayed on the network page (e.g., "memory type", "brand", features", etc.). The facets 402 may be displayed in any order. As illustrated in FIG. 4, the facet "Memory Type" 410 is selected by a user using, in this example, a cursor 412. A user may select a facet in other ways known in the art such as, by way of example only, touching the facet with her finger if the display is a touch screen, voice activating a selection, and the like.

FIG. 5 illustrates one example of how the attribute associated with selected facet 410 in FIG. 4 is exposed or displayed in the network page 500 rendered by a Web browser that provides a search box 504 and a search radio button 506. In this instance, the facet "Memory Type" 510 is expanded to display the memory type attributes 512 associated with at least the search result items displayed above-the-fold. For example, the search result items, in the aggregate, include one or more of the following attributes: "DDR-SDRAM," "DDR2-SDRAM," "DDR3-SDRAM," and "SDRAM". Upon selection of the facet 510 (illustrated in reference to element 410 in FIG. 4), the "memory type" of each search result item is displayed in conjunction with the search result item itself. As shown in FIG. 5 by way of example only, the memory type "DDR-SDRAM" is displayed with the item 530 (xyz 2 GB memory modules), the memory type "DDR2-SDRAM is displayed with the item 534 (abc 2 GB memory modules), and the memory type "DDR3-SDRAM" is displayed with the items 532 and 536 (123 8 GB memory kit and 456 8 GB memory kit, respectively).

In one embodiment, attributes associated with the selected facet may be shown as moving across the network page 500 from the selected facet to each respective item. For example, the facet attributes 512 may be shown as "flying" from their respective locations in the left corner of the page 500 across the page to their new respective locations as indicated by arrows 560, 562, 564, and 568. Other ways of showing the movement of attributes (e.g., involving animation of various kinds) may also be used. If a user subsequently selects one of the attributes 512, the search results may be further filtered by the selected attribute and displayed to the user.

As described above in reference to FIG. 4, the facet 410 may originally be displayed to a user, but the facet attributes may be hidden (i.e., not shown). A first selection of a facet 410 causes the attributes 512 to be displayed on the left side of the browser 500. At the same time, the attributes 512 will be displayed with respective item information as shown in FIG. 5 and described above. If a user selects the facet 510 again, the attributes will be removed from the respective item information. At the same time, the attributes 512 shown on the left side of the browser display 500 may "collapse" and be "hidden behind" the facet 510 (i.e., no longer displayed).

FIG. 6 illustrates one example of how the attributes associated with a facet may be selected to be displayed in the network page 600 rendered by a Web browser that provides a search box 604 and a search radio button 606. In an embodiment, the facet attributes 612 may be originally (e.g., before a user selection of a facet) displayed along with the facet 610, for example, underneath the facet as shown. For example, some or all displayed facets may be "expanded" to show associated attributes, as illustrated by facets 640 and 650 and associated attributes 642 and 652 respectively. In addition, a selectable element (a link, a radio button or other type of selectable element) 680 "Show Me" may be displayed to the user along with the facets 612. Similarly, selectable elements "Show Me" 644 and 654 may be displayed along with the facets 640 and 650 respectively. A user selection of the element 680 "Show Me," for example, may cause the attributes 612 to move across the page as indicated by arrows 660, 662, 664, and 668 and be displayed along with the search results 630, 632, 634, and 636. The element 680's designation may be replaced after the first user selection with, for example, "Hide." If a user selects the element 680 again (i.e., selects "Hide"), the attributes 612 may be removed from the search results 630, 632, 634, and 636.

As discussed above, the various embodiments can be implemented in a wide variety of operating environments which, in some cases, can include one or more client computers, computing devices, or processing devices which can be used to operate any of a number of applications. Client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response to requests from client devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including, without limitation, those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices, such as random access memory ("RAM") or read-only memory ("ROM"), as well as removable media devices, memory cards, flash cards, and the like.

Such devices also can include a computer-readable storage media reader, a communications device (e.g., a modem, a network card (wireless or wired), an infrared communication device), and working memory as described above. The computer-readable storage media reader can be connected with, or configured to receive, a computer-readable storage medium, representing remote, local, fixed, and/or removable storage devices, as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the present disclosure as set forth in the claims.

What is claimed is:

1. A computer-implemented method for displaying item attributes in a network page, comprising:
    under control of one or more hardware computer systems configured with executable instructions,
        receiving a search request, wherein the search request includes at least one search term, and performing a search based on the search request;
        displaying search results from the search including a plurality of items retrieved in response to the search request, each item having associated item information displayed proximate to the item, the search results further including a plurality of facets associated with the retrieved items and displayed in a grouping in association with the items, each facet being associated with one or more item attributes that are not displayed with the search results; and
        in response to a selection of a facet of the plurality of displayed facets, and without performing an additional search:
            determining that a first subset of the plurality of displayed items each has at least one of the one or more item attributes that are associated with the selected facet and that are not displayed with the search results, and that a second subset of the plurality of displayed items each does not have any of the one or more item attributes that are associated with the selected facet; and
            updating the displayed search results to cause, for each of the displayed items of the first subset, the at least one item attribute of the displayed item to be displayed with the updated displayed search results, and wherein the updated displayed search results further include the displayed items of the second subset that do not have any of the one or more item attributes that are associated with the selected facet.

2. The computer-implemented method of claim 1 wherein the updating of the displayed search results includes updating the displayed grouping of the plurality of facets to cause the one or more item attributes associated with the selected facet to be displayed with the selected facet in the updated displayed grouping.

3. The computer-implemented method of claim 1, further comprising: in response to a second selection of the facet of the plurality of displayed facets, further updating the displayed search results to remove the displayed at least one item attributes of the displayed items of the first subset, the further updating of the displayed search results being performed without performing an additional search.

4. The computer-implemented method of claim 1 wherein the search request is received from a user, wherein the displayed search results and the updated displayed search results are displayed to the user, wherein the selection of the facet is performed by the user, and wherein the method further comprises: storing information associated with the search for later use, the stored information including indications of the selection of the facet.

5. A computer-implemented method comprising:
    under control of one or more hardware computer systems configured with executable instructions,
        receiving, from a client device, a search query;
        providing, for display to a user, a page containing search result items from a search based on the received query and containing selectable facets, wherein each selectable facet corresponds to an attribute associated with at least one of the search result items; and
        in response to a selection by the user of one of the selectable facets, and without performing an additional search:
            identifying each of the search result items that is associated with the attribute corresponding to the selected facet, at least one of the search result items not being associated with the attribute corresponding to the selected facet; and
            causing, for each of the identified search result items, the attribute corresponding to the selected facet to be exposed on the displayed page while retaining all of the search result items on the displayed page.

6. The computer-implemented method of claim 5, wherein the attribute corresponding to the selected facet is of a single attribute type.

7. The computer-implemented method of claim 5, wherein the search query includes a search request from the user including at least one search term.

8. The computer-implemented method of claim 5, wherein the causing of the attribute corresponding to the selected facet to be exposed includes causing the attribute to move across the page to each of the identified search result items in an animated fashion.

9. The computer-implemented method of claim 5, wherein the search query includes a browse request associated with a selection by the user of at least one selectable object rendered on the client device.

10. The computer-implemented method of claim 5, further comprising:
    tracking user behavior associated with the search query and subsequent user selections of facets and attributes associated with the search result items;
    associating the tracked user behavior for the user with results that include the user purchasing one of the search result items; and storing information about the associated tracked user behavior.

11. The computer-implemented method of claim 10, further comprising:
based on the stored information, associating a search term with a facet; and
in response to a later indication of the search term, causing the associated facet to be displayed in association with search results provided based on the search term.

12. The computer-implemented method of claim 10, further comprising: generating a targeted advertisement for the search result items based on the stored information.

13. The computer-implemented method of claim 10, further comprising:
ranking facets for each of the search result items based on the stored information; and
in response to a request for one of the search result items, providing information for display about the ranked facets for the requested one search result item.

14. The computer-implemented method of claim 13, further comprising:
based on the stored information, determining one or more most popular attributes for the requested one search result item based at least in part on the subsequent user selections; and
providing information about the determined one or more most popular attributes for display with the requested one search result item.

15. A computer system comprising:
at least one hardware processor; and
at least one memory having computer-executable instructions that, when executed on the at least one hardware processor, cause the at least one hardware processor to:
receive, from a client device, a search query;
provide, for display to a user, a page containing search result items from a search based on the received query and containing selectable facets, wherein each selectable facet corresponds to an attribute associated with at least one of the search result items; and
in response to a selection by the user of one of the selectable facets, and without performing an additional search:
identify each of the search result items that is associated with the attribute corresponding to the selected facet; and
cause, for each of the identified search result items, the attribute corresponding to the selected facet to be exposed on the displayed page while retaining all of the search result items on the displayed page.

16. The computer system of claim 15, wherein the computer-executable instructions further cause the at least one hardware processor to:
determine that the selected facet is associated with a tag provided by the user;
store information about the tag in association with the selected facet; and
in response to a second search query, provide, for display to the user, a second page containing second search result items relevant to the second search query, the page including an indication of the selected facet based at least in part on the tag.

17. The computer system of claim 15, wherein the search result items include at least one item that is identified as not being associated with any attribute corresponding to the selected facet.

18. The computer system of claim 15, wherein the computer-executable instructions further cause the at least one hardware processor to cause the attribute corresponding to the selected facet to move across the page to each of the identified search result items in an animated fashion.

19. The computer system of claim 15, wherein the computer-executable instructions further cause the at least one hardware processor to:
track user behavior associated with the search query and subsequent user selections of facets and attributes associated with the search result items;
associate the tracked user behavior for the user with results including the user purchasing an item or viewing an item; and
store information about the associated tracked user behavior.

20. A non-transitory computer-readable medium having computer-executable instructions stored thereon that, when executed by a hardware computer, cause the hardware computer to:
receive, from a client device, a search query;
provide, for display to a user, a page containing search result items relevant to the received query and containing selectable facets, wherein each selectable facet corresponds to an attribute associated with at least one of the search result items; and
in response to a selection by the user of one of the selectable facets,
identify each of the search result items that is associated with the attribute corresponding to the selected facet, at least one of the search result items not being associated with the attribute corresponding to the selected facet; and
cause, for each of the identified search result items, the attribute corresponding to the selected facet to be exposed on the displayed page while retaining all of the search result items on the displayed page.

21. The non-transitory computer-readable medium of claim 20, wherein the computer-executable instructions further cause the hardware computer to store information about subsequent user behavior associated with a search for an item, the subsequent user behavior including one or more selections of the displayed facets and the attributes.

22. The non-transitory computer-readable medium of claim 21, wherein the computer-executable instructions further cause the hardware computer to:
determine at least one most popular facet for at least one item based on the stored information; and
provide the determined at least one most popular facet to be displayed in association with the at least one item.

23. The non-transitory computer-readable medium of claim 21, wherein the computer-executable instructions further cause the hardware computer to:
determine at least one least popular facet for at least one item based on the stored information; and
remove the determined at least one most popular facet from a display in association with the at least one item.

24. The non-transitory computer-readable medium of claim 20 wherein the computer-executable instructions further cause the hardware computer to, before the providing of the page, perform a first search based on the search query to identify the search result items, and wherein the causing of the attribute corresponding to the selected facet to be exposed on the displayed page is performed without performing any additional search after the first search.

* * * * *